(12) United States Patent
Chen

(10) Patent No.: US 10,390,296 B2
(45) Date of Patent: Aug. 20, 2019

(54) DEVICE AND METHOD OF HANDLING A CELL SELECTION PROCEDURE OR A CELL RESELECTION PROCEDURE

(71) Applicant: HTC Corporation, Taoyuan (TW)

(72) Inventor: Te-Ming Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/969,789

(22) Filed: May 3, 2018

(65) Prior Publication Data

US 2018/0324687 A1    Nov. 8, 2018

Related U.S. Application Data

(60) Provisional application No. 62/501,774, filed on May 5, 2017.

(51) Int. Cl.

| | |
|---|---|
| *H04W 48/16* | (2009.01) |
| *H04W 36/00* | (2009.01) |
| *H04B 7/0408* | (2017.01) |
| *H04W 48/20* | (2009.01) |
| *H04B 17/318* | (2015.01) |

(Continued)

(52) U.S. Cl.
CPC .......... *H04W 48/16* (2013.01); *H04B 7/0408* (2013.01); *H04B 17/318* (2015.01); *H04W 24/08* (2013.01); *H04W 36/0061* (2013.01); *H04W 36/0083* (2013.01); *H04W 36/0085* (2018.08); *H04W 36/0094* (2013.01); *H04W 36/00837* (2018.08); *H04W 48/20* (2013.01); *H04W 16/28* (2013.01)

(58) Field of Classification Search
None
See application file for complete search history.

(56) References Cited

U.S. PATENT DOCUMENTS

| | | |
|---|---|---|
| 2011/0263260 A1 | 10/2011 | Yavuz |
| 2013/0058234 A1 | 3/2013 | Yang |

(Continued)

FOREIGN PATENT DOCUMENTS

| | | |
|---|---|---|
| JP | 2003-134550 | 5/2003 |
| KR | 10-2010-0110526 | 10/2010 |
| WO | 2016/089146 A1 | 6/2016 |

OTHER PUBLICATIONS

3GPP TS 38.300 V0.1.3 (Apr. 2017).

(Continued)

*Primary Examiner* — Jutai Kao
(74) *Attorney, Agent, or Firm* — Winston Hsu

(57) ABSTRACT

A communication device for handling a cell selection procedure or a cell reselection procedure comprises a storage device and a processing circuit, coupled to the storage device. The storage device stores, and the processing circuit is configured to execute instructions of: measuring a plurality of power values corresponding to a plurality of beams of a cell; determining a first cell quality value according to an average of the plurality of power values; determining an offset value according to a number of the plurality of beams corresponding to the plurality of power values; determining a second cell quality value according to the first cell quality value and the offset value; and performing the cell selection procedure or the cell reselection procedure according to the second cell quality value.

17 Claims, 4 Drawing Sheets

(51) Int. Cl.
*H04W 24/08* (2009.01)
*H04W 16/28* (2009.01)

(56) References Cited

U.S. PATENT DOCUMENTS

| | | | |
|---|---|---|---|
| 2015/0222345 | A1 | 8/2015 | Chapman |
| 2016/0212631 | A1* | 7/2016 | Shen ................... H04W 56/001 |
| 2016/0262077 | A1 | 9/2016 | Zhang |
| 2018/0324661 | A1* | 11/2018 | Ryden ................... H04W 48/20 |
| 2018/0331746 | A1* | 11/2018 | Okuyama ............. H04W 16/28 |
| 2019/0132066 | A1* | 5/2019 | Park ................. H04W 36/0094 |

OTHER PUBLICATIONS

3GPP TSG-RAN WG2 Meeting #97bis Chairman Notes, Apr. 2017.
3GPP TS 36.304 V14.2.0 (Mar. 2017).
Office action dated Oct. 5, 2018 for the Taiwan application No. 107115201, filing date May 4, 2018, pp. 1-6.
Search Report dated Aug. 21, 2018 for EP application No. 18170853.8, pp. 1-6.
Nokia, Alcatel-Lucent Shanghai Bell, "On Deriving Cell Quality in NR", 3GPP TSG-RAN WG2 NR #97, R2-1701572, Feb. 13-17, 2017, Athens, Greece, XP051212189, pp. 1-3.
Huawei, HiSilicon, "Cell quality derivation from multiple beam quality", 3GPP TSG-RAN WG2#97bis, R2-1703386, Apr. 3-7, 2017, Spokane, USA, XP051245248, pp. 1-3.
NEC, "On selection of N best beams for cell quality derivation", 3GPP TSG-RAN WG2 Meeting #97-Bis, R2-1703709, Apr. 3-7, 2017, Spokane, USA, XP051245517, pp. 1-2.

* cited by examiner

DEVICE AND METHOD OF HANDLING A CELL SELECTION PROCEDURE OR A CELL RESELECTION PROCEDURE

CROSS REFERENCE TO RELATED APPLICATIONS

This application claims the benefits of U.S. Provisional Applications No. 62/501,774 filed on May 5, 2017, which is incorporated herein by reference.

BACKGROUND OF THE INVENTION

1. Field of the Invention

The present invention relates to a device and a method used in a wireless communication system, and more particularly, to a device and a method of handling a cell selection procedure or a cell reselection procedure.

2. Description of the Prior Art

A user equipment (UE) may perform a cell selection procedure or a cell reselection procedure before performing communications via the cell. However, it may not be proper to perform the cell selection procedure or the cell reselection procedure only according to a cell quality derived from the cell, when multiple beams belong to the cell. Thus, how to perform the cell selection procedure regarding the beams belonging to the cell is an important problem to be solved.

SUMMARY OF THE INVENTION

The present invention therefore provides a method and related communication device for handling a cell selection procedure or a cell reselection procedure to solve the abovementioned problem.

A communication device for handling a cell selection procedure or a cell reselection procedure comprises a storage device and a processing circuit, coupled to the storage device. The storage device stores, and the processing circuit is configured to execute instructions of: measuring a plurality of power values corresponding to a plurality of beams of a cell; determining a first cell quality value according to an average of the plurality of power values; determining an offset value according to a number of the plurality of beams corresponding to the plurality of power values; determining a second cell quality value according to the first cell quality value and the offset value; and performing the cell selection procedure or the cell reselection procedure according to the second cell quality value.

A communication device for handling a cell selection procedure or a cell reselection procedure comprises a storage device and a processing circuit, coupled to the storage device. The storage device stores, and the processing circuit is configured to execute instructions of: measuring a plurality of power values corresponding to a plurality of beams of a cell; determining a cell quality value according to an average of the plurality of power values; determining a threshold value according to a number of the plurality of beams corresponding to the plurality of power values; performing a comparison of the cell quality value and the threshold value; and performing the cell selection procedure to select the cell or performing the reselection procedure to reselect the cell, when the comparison is that the cell quality value is greater than the threshold value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
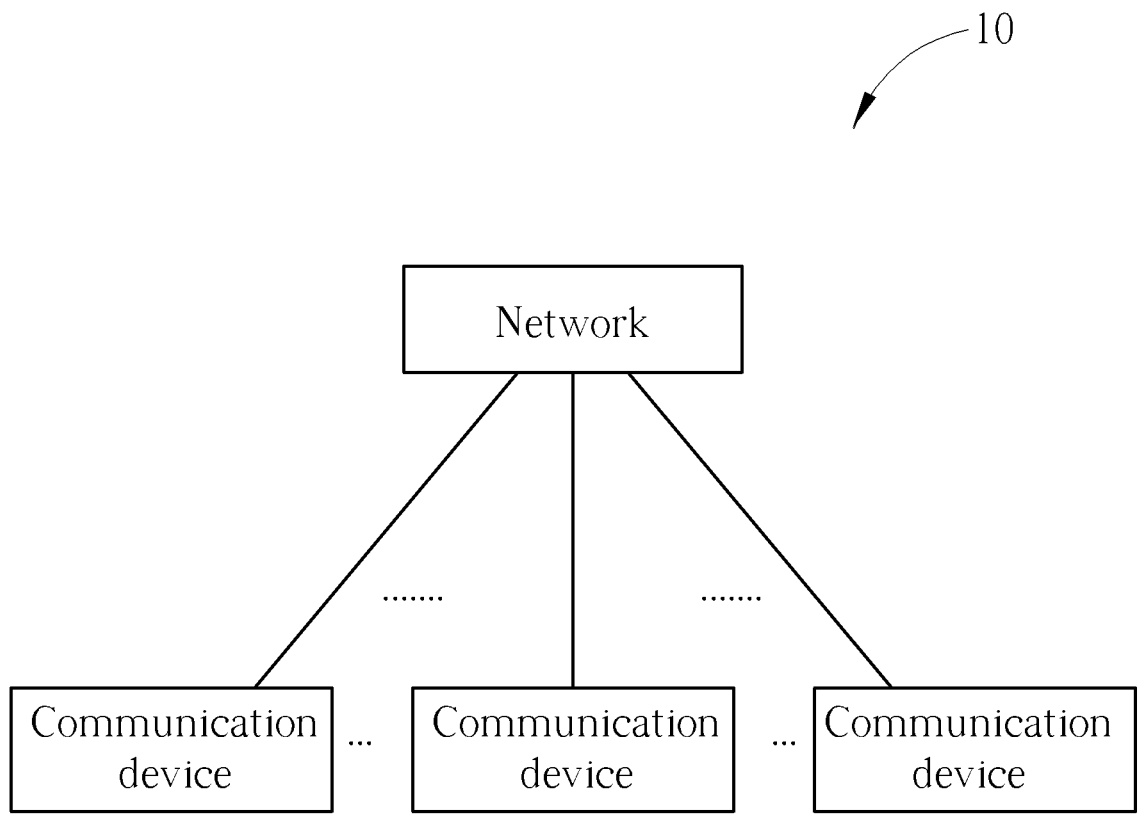
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and the communication device may simultaneously communicate with each other via one or multiple cells (e.g., multiple carriers) including a primary cell (PCell) and one or more secondary cells (SCells), after the communication device performs a cell selection procedure to select the one or multiple cells, or after the communication device performs a cell reselection procedure to reselect the one or multiple cells. The abovementioned cells may be operated in the same or different duplexing modes, e.g., frequency-division duplexing (FDD), time-division duplexing (TDD) or flexible duplexing. For example, the PCell may be operated on a licensed carrier, while the SCell may be operated on an unlicensed carrier.

In FIG. 1, the network and the communication devices are simply utilized for illustrating the structure of the wireless communication system 10. Practically, the network may be a narrowband internet of things (NB-IoT) network or an evolved universal terrestrial radio access network (E-UTRAN) including at least one evolved Node-B (eNB). The network may be a new radio (NR)/next generation (NextGen) network including at least one 5G base station (BS) (or called gNB). The 5G radio communication technology may employ orthogonal frequency-division multiplexing (OFDM) and/or non-OFDM, and transmission time interval (TTI) shorter than 1 ms (e.g., 1, 2, 3 or 4 OFDM symbols, 100, or 200 us) for communicating between the communication devices and the 5G BS. In general, a BS may also be used to refer any of the eNB and the 5G BS.

A communication device may be a user equipment (UE), a NB-IoT UE, a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for a UL, the communication device is the transmitter and the network is the receiver, and for a DL, the network is the transmitter and the communication device is the receiver.

Figure 2:
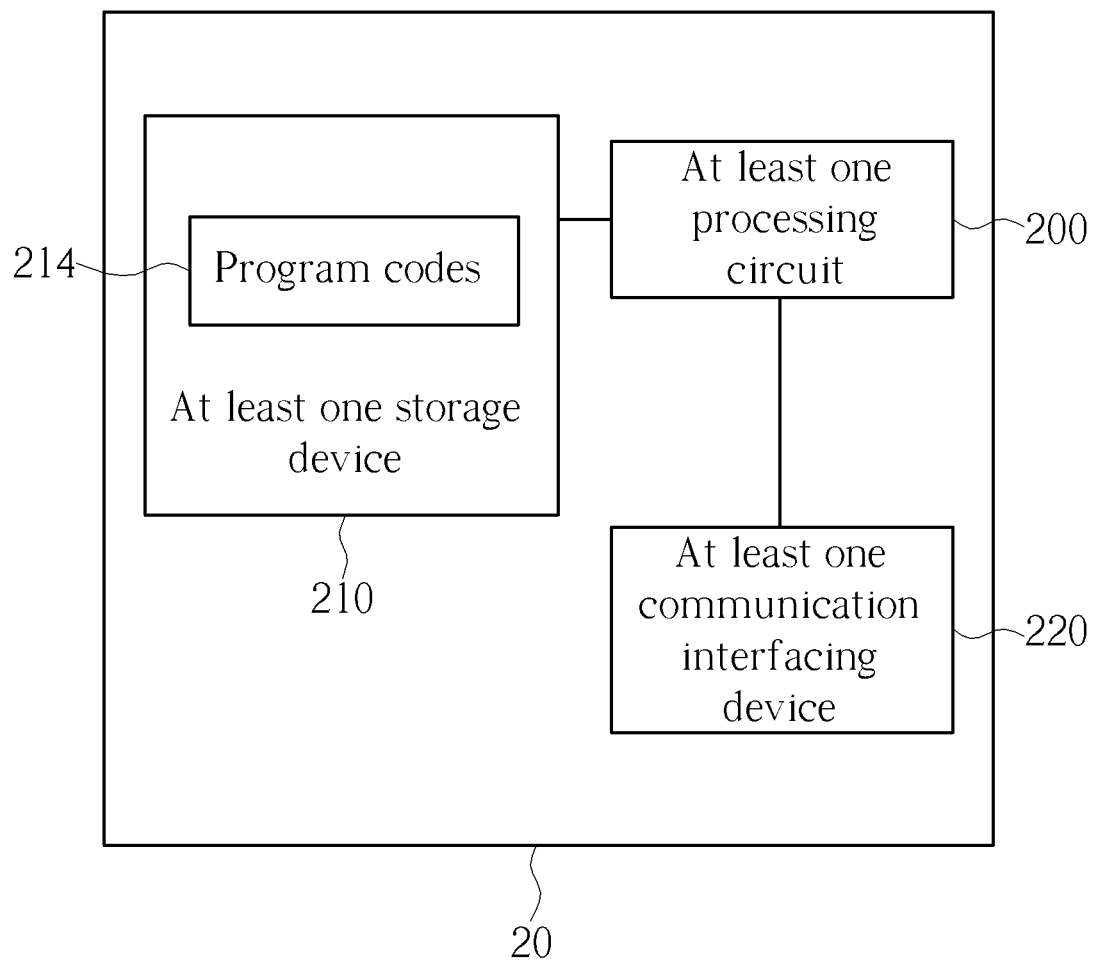
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used to represent a communication device in FIG. 1, to simplify the illustration of the embodiments.

Figure 3:
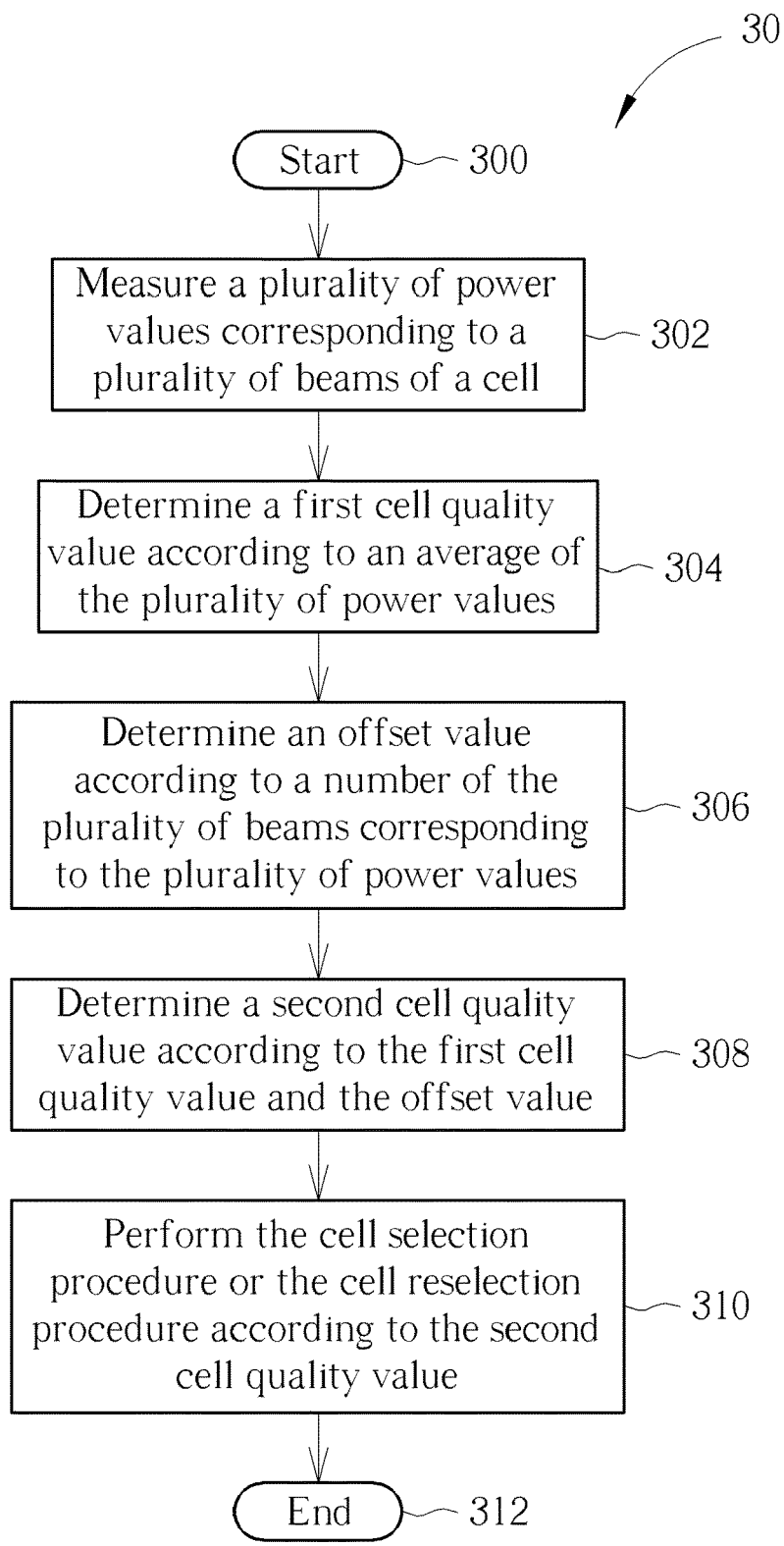
FIG. 3 is a flowchart of a process according to an example of the present invention.

A process 30 in FIG. 3 may be utilized in a UE, and includes the following steps:

Step 300: Start.

Step 302: Measure a plurality of power values corresponding to a plurality of beams of a cell.

Step 304: Determine a first cell quality value according to an average of the plurality of power values.

Step 306: Determine an offset value according to a number of the plurality of beams corresponding to the plurality of power values.

Step 308: Determine a second cell quality value according to the first cell quality value and the offset value.

Step 310: Perform the cell selection procedure or the cell reselection procedure according to the second cell quality value.

Step 312: End.

According to the process 30, the UE (e.g., in an idle mode) measures a plurality of power values corresponding to a plurality of beams of a cell. The UE may actually measures more than a plurality of beams, and the plurality of beams in the process 30 may be a number of best ones among the beams that the UE have measured. The UE determines a first cell quality value according to (e.g., by using) an average of the plurality of power values. The UE determines an offset value according to a number of the plurality of beams corresponding to the plurality of power values. The UE determines a second cell quality value according to (e.g., by using) the first cell quality value and the offset value. The UE performs the cell selection procedure or the cell reselection procedure according to the second cell quality value. That is, not only the first cell quality value but also the number of the plurality of beams are considered by the UE for performing the cell selection procedure or the cell reselection procedure.

In one example, the UE determines that the offset value is a first value (e.g., −10 dbm), if the number of the plurality of beams is a first number (e.g., 1). The UE determines that the offset value is a second value smaller than the first value (e.g., −15 dbm), if the number of the plurality of beams is a second number greater than the first number (e.g., 2). That is, the greater the number of the plurality of beams is, the smaller the offset value is.

In one example, the UE determines that the offset value is a first value (e.g., −10 dbm), if the number of the plurality of beams is smaller than a threshold (e.g., 3). The UE determines that the offset value is a second value smaller than the first value (e.g., −15 dbm), if the number of the plurality of beams is greater than the threshold (e.g., 3). That is, the offset value is determined according to a comparison of the number of the plurality of beams and the threshold.

In one example, the UE determines that the offset value is a first offset value received from a network (e.g., the network in FIG. 1). For example, the first offset value is corresponding to the number of the plurality of beams. In one example, the UE determines that the offset value is a second offset value stored (e.g., predetermined) in the UE. For example, the second offset value is corresponding to the number of the plurality of beams.

In one example, the UE determines that the offset value is the second offset value, before receiving the first offset value from the network. In one example, the UE determines that the offset value is the first offset value, after receiving the first offset value from the network. That is, the UE use the first offset value instead of the second offset value, after receiving the first offset value from the network.

In one example, the first offset value or the second offset value is used for performing the cell selection procedure, to select the cell (e.g., a serving cell). In one example, the first offset value or the second offset value is used for performing the cell reselection procedure, to reselect the cell (e.g., a neighbor cell).

In one example, the UE determines the second cell quality value according to (e.g., by using) the offset value (i.e., the same offset value) on all cells with the same frequency as that of the cell (e.g., the serving cell or the neighbor cell).

In one example, the UE determines the second cell quality value by adding the first cell quality value and the offset value. In one example, the UE determines the second cell quality value by subtracting the first cell quality value and the offset value. In one example, the UE determines the second cell quality value by multiplying the first cell quality value and the offset value. In one example, the UE determines the second cell quality value by dividing the first cell quality value by the offset value.

In one example, the UE performs the cell selection procedure to select the cell (e.g., a serving cell), when the second cell quality value is greater than a first threshold. In one example, the UE performs the cell reselection procedure to reselect the cell (e.g., a neighbor cell), when the second cell quality value is greater than a second threshold. In one example, the first threshold and the second threshold are received from a network (e.g., the network in FIG. 1). In one example, the first threshold and the second threshold are stored (e.g., predetermined) in the UE, and a third threshold for performing the cell selection procedure and a fourth threshold for performing the cell reselection procedure are received from the network. The UE may use the third threshold or the fourth threshold instead of the first threshold or the second threshold, after receiving the third threshold or the fourth threshold from the network. In one example, the first threshold and the second threshold are the same. In one example, the second threshold is a third cell quality value of the serving cell of the UE.

In one example, the first cell quality value is derived from a channel state information reference signal (CSI-RS) of the cell. In one example, the first cell quality value is a reference signal received power (RSRP) value or a reference signal received quality (RSRQ) value.

Figure 4:
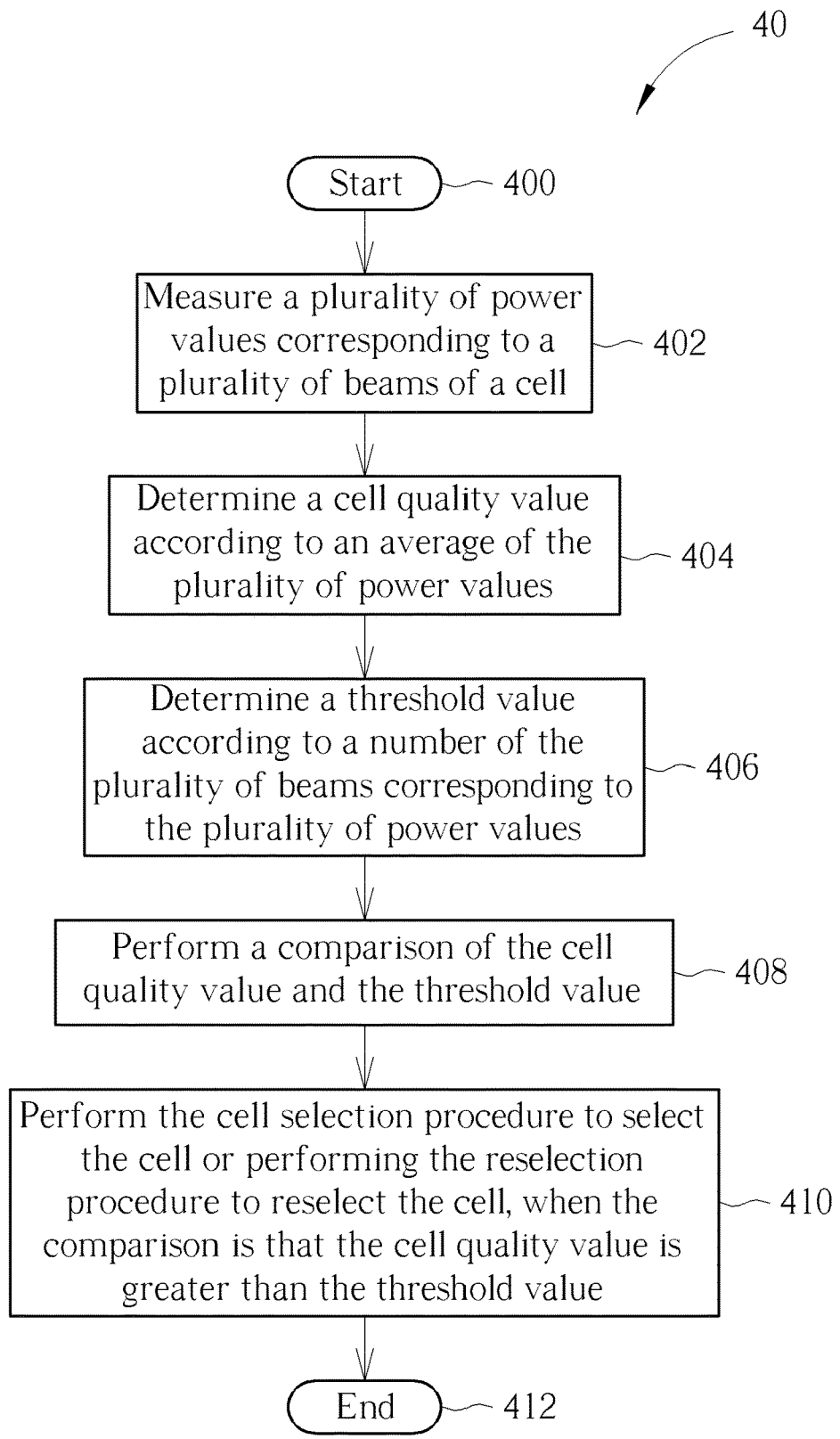
FIG. 4 is a flowchart of a process according to an example of the present invention.

A process 40 in FIG. 4 may be utilized in a UE, and includes the following steps:

Step 400: Start.

Step 402: Measure a plurality of power values corresponding to a plurality of beams of a cell.

Step 404: Determine a cell quality value according to an average of the plurality of power values.

Step 406: Determine a threshold value according to a number of the plurality of beams corresponding to the plurality of power values.

Step 408: Perform a comparison of the cell quality value and the threshold value.

Step 410: Perform the cell selection procedure to select the cell or performing the reselection procedure to reselect the cell, when the comparison is that the cell quality value is greater than the threshold value.

Step 412: End.

According to the process 40, the UE (e.g., in an idle mode) measures a plurality of power values corresponding to a plurality of beams of a cell. The UE may actually measures more than a plurality of beams, and the plurality of beams in the process 40 may be a number of best ones among the beams that the UE have measured. The UE determines a cell quality value according to (e.g., by using) an average of the plurality of power values. The UE determines a threshold value according to (e.g., by using) a number of the plurality of beams corresponding to the plurality of power values. The UE performs a comparison of the cell quality value and the threshold value. The UE performs the cell selection procedure to select the cell or performing the reselection procedure to reselect the cell, when the comparison is that the cell quality value is greater than the threshold value. That is, not only the cell quality value but also the number of the plurality of beams are considered by the UE for performing the cell selection procedure or the cell reselection procedure.

In one example, the UE determines that the threshold value is a first value (e.g., −90 dbm), if the number of the plurality of beams is a first number (e.g., 1). The UE determines that the threshold value is a second value smaller than the first value (e.g., −100 dbm), if the number of the plurality of beams is a second number greater than the first number (e.g., 2). That is, the greater the number of the plurality of beams is, the smaller the threshold value is.

In one example, the UE determines that the threshold value is a first value (e.g., −90 dbm), if the number of the plurality of beams is smaller than a threshold (e.g., 3). The UE determines that the threshold value is a second value smaller than the first value (e.g., −100 dbm), if the number of the plurality of beams is greater than the threshold (e.g., 3). That is, the threshold value is determined according to a comparison of the number of the plurality of beams and the threshold.

In one example, the UE determines that the threshold value is a first threshold value received from a network (e.g., the network in FIG. 1). For example, the first offset value is corresponding to the number of the plurality of beams. In one example, the UE determines that the threshold value is a second threshold value stored in the UE. For example, the second offset value is corresponding to the number of the plurality of beams.

In one example, the UE determines that the threshold value is the second threshold value, before receiving the first threshold value from the network. In one example, the UE determines that the threshold value is the first threshold value, after receiving the first threshold value from the network. That is, the UE use the first offset value instead of the second offset value, after receiving the first offset value from the network.

In one example, the first threshold value or the second threshold value is used for performing the cell selection procedure, to select the cell (e.g., a serving cell). In one example, the first threshold value or the second threshold value is used for performing the cell reselection procedure, to reselect the cell (e.g., a neighbor cell).

In one example, the UE performs the comparison according to (e.g., by using) the threshold value (i.e., the same threshold value) on all cells with the same frequency as that of the cell (e.g., the serving cell or the neighbor cell).

In one example, the cell quality value is derived from a CSI-RS of the cell. In one example, the cell quality value is a RSRP value or a RSRQ value.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. For example, the skilled person easily makes new embodiments of the network based on the embodiments and examples of the UE or the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling a cell selection procedure or a cell reselection procedure. Both the cell quality value and the number of the plurality of beams are considered by the UE for performing the cell selection procedure or the cell reselection procedure. As a result, the problem of performing the cell selection procedure or the cell reselection procedure regarding multiple beams belonging to the cell is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a cell selection procedure or a cell reselection procedure, comprising:
   a storage device; and
   a processing circuit, coupled to the storage device, wherein the storage device stores, and the processing circuit is configured to execute instructions of:
   measuring a plurality of power values corresponding to a plurality of beams of a cell;
   determining a first cell quality value according to an average of the plurality of power values;
   determining an offset value according to a number of the plurality of beams corresponding to the plurality of power values;
   determining a second cell quality value according to the first cell quality value and the offset value; and
   performing the cell selection procedure or the cell reselection procedure according to the second cell quality value.

2. The communication device of claim 1, wherein the instruction of determining the offset value according to the number of the plurality of beams comprises:
   determining that the offset value is a first value, if the number of the plurality of beams is a first number; and determining that the offset value is a second value smaller than the first value, if the number of the plurality of beams is a second number greater than the first number.

3. The communication device of claim 1, wherein the instruction of determining the offset value according to the number of the plurality of beams comprises:
determining that the offset value is a first value, if the number of the plurality of beams is smaller than a threshold; and
determining that the offset value is a second value smaller than the first value, if the number of the plurality of beams is greater than the threshold.

4. The communication device of claim 1, wherein the communication device determines that the offset value is a first offset value received from a network, or determines that the offset value is a second offset value stored in the communication device.

5. The communication device of claim 4, wherein the communication device determines that the offset value is the second offset value before receiving the first offset value from the network, and determines that the offset value is the first offset value after receiving the first offset value from the network.

6. The communication device of claim 1, wherein the instruction of determining the second cell quality value according to the first cell quality value and the offset value comprises:
determining the second cell quality value by adding the first cell quality value and the offset value, subtracting the first cell quality value and the offset value, multiplying the first cell quality value and the offset value, or dividing the first cell quality value by the offset value.

7. The communication device of claim 1, wherein the instruction of performing the cell selection procedure or the cell reselection procedure according to the second cell quality value comprises:
performing the cell selection procedure to select the cell, when the second cell quality value is greater than a first threshold; or
performing the cell reselection procedure to reselect the cell, when the second cell quality value is greater than a second threshold.

8. The communication device of claim 7, wherein the first threshold and the second threshold are received from a network, or the first threshold and the second threshold are stored in the communication device.

9. The communication device of claim 7, wherein the first threshold and the second threshold are the same.

10. The communication device of claim 7, wherein the second threshold is a third cell quality value of a serving cell of the communication device.

11. The communication device of claim 1, wherein the first cell quality value is a reference signal received power (RSRP) value or a reference signal received quality (RSRQ) value.

12. A communication device for handling a cell selection procedure or a cell reselection procedure, comprising:
a storage device; and
a processing circuit, coupled to the storage device, wherein the storage device stores, and the processing circuit is configured to execute instructions of:
measuring a plurality of power values corresponding to a plurality of beams of a cell;
determining a cell quality value according to an average of the plurality of power values;
determining a threshold value according to a number of the plurality of beams corresponding to the plurality of power values;
performing a comparison of the cell quality value and the threshold value; and
performing the cell selection procedure to select the cell or performing the reselection procedure to reselect the cell, when the comparison is that the cell quality value is greater than the threshold value.

13. The communication device of claim 12, wherein the instruction of determining the threshold value according to the number of the plurality of beams comprises:
determining that the threshold value is a first value, if the number of the plurality of beams is a first number; and
determining that the threshold value is a second value smaller than the first value, if the number of the plurality of beams is a second number greater than the first number.

14. The communication device of claim 12, wherein the instruction of determining the threshold value according to the number of the plurality of beams comprises:
determining that the threshold value is a first value, if the number of the plurality of beams is smaller than a threshold; and
determining that the threshold value is a second value smaller than the first value, if the number of the plurality of beams is greater than the threshold.

15. The communication device of claim 12, wherein the communication device determines that the threshold value is a first threshold value received from a network, or determines that the threshold value is a second threshold value stored in the communication device.

16. The communication device of claim 15, wherein the communication device determines that the threshold value is the second threshold value before receiving the first threshold value from the network, and determines that the threshold value is the first threshold value after receiving the first threshold value from the network.

17. The communication device of claim 12, wherein the cell quality value is a reference signal received power (RSRP) value or a reference signal received quality (RSRQ) value.

* * * * *